United States Patent [19]

Reeder, Jr. et al.

[11] Patent Number: 4,661,227

[45] Date of Patent: Apr. 28, 1987

[54] APPARATUS AND METHOD FOR REMOVAL OF INORGANIC AQUEOUS SOLUTIONS FROM ORGANIC SOLVENTS

[75] Inventors: Alfred R. Reeder, Jr., Danbury; Joe B. Lovett, Sweeny; Barry W. Archer, Lake Jackson, all of Tex.

[73] Assignee: The Dow Chemical Company, Midland, Mich.

[21] Appl. No.: 772,540

[22] Filed: Sep. 4, 1985

[51] Int. Cl.[4] .............................................. B01D 17/06
[52] U.S. Cl. ..................................... 204/186; 204/302
[58] Field of Search ....................... 204/186, 302, 306

[56] References Cited

U.S. PATENT DOCUMENTS 3,582,491 6/1971 Louvar ................................. 204/186

Primary Examiner—T. M. Tufariello

[57] ABSTRACT

In the preferred and illustrated embodiment, a coalescer for separating an organic solvent from an aqueous solution (typically with an inorganic salt dissolved therein) is disclosed. In the preferred and illustrated embodiment, an upstanding housing having a central electrode is constructed with interleaved conical members. The conical members define a tortuous flow path. The heavier aqueous droplets are coalesced into larger droplets, collecting and travelling downwardly in a collection tube for removal from the bottom of the housing. The lighter organic solvent is removed from the top of the apparatus.

17 Claims, 4 Drawing Figures

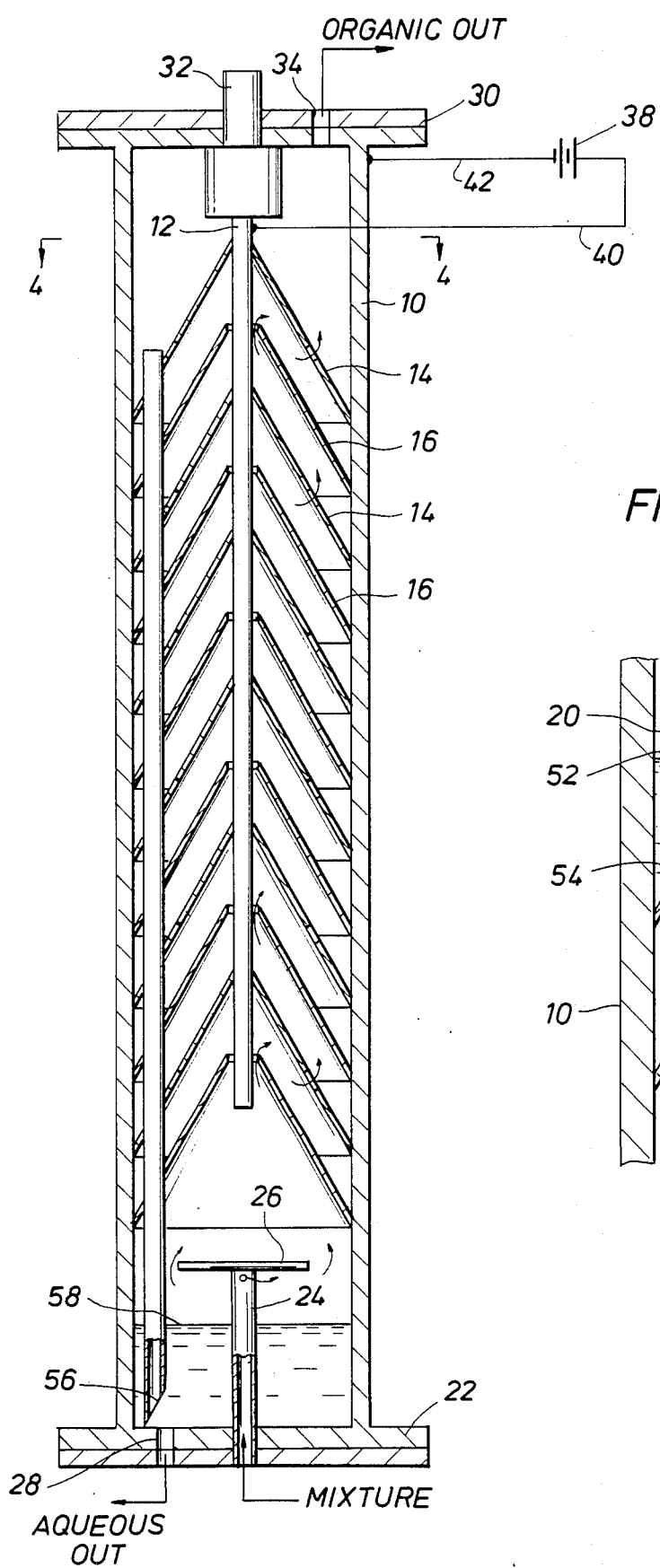
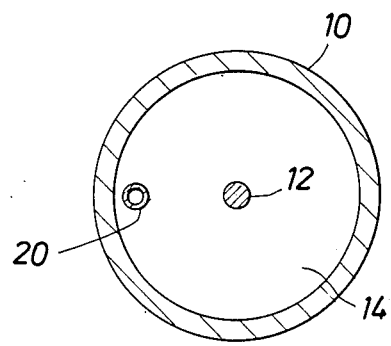
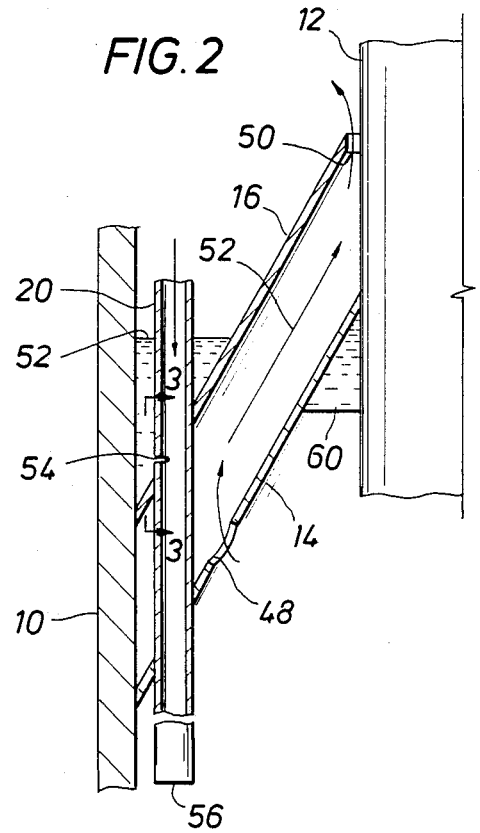
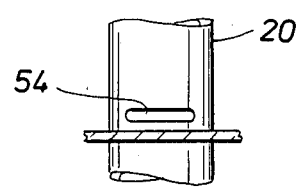

APPARATUS AND METHOD FOR REMOVAL OF INORGANIC AQUEOUS SOLUTIONS FROM ORGANIC SOLVENTS

BACKGROUND OF THE DISCLOSURE

This Disclosure is directed to a method and apparatus for separation of an organic solvent from aqueous solutions of inorganic salts. In various processes, an aqueous solution is recovered along with an organic solvent. The aqueous solution may be substantially pure water or may have very substantial quantities of dissolved inorganic materials in it. Potentially, the liquids can be so thoroughly mixed that separation is very difficult. Surface tension characteristics plus the difference in densities and miscibility determine the mixture.

Apparatus is available for separation. One is an electrostatic coalescer manufactured by Petrolite. An electrostatic charge in such a device separates the two liquids. In general terms, the degree of separation is enhanced if the voltage level is raised. However, when the voltage level is raised, there is a risk of arcing. This risk is increased where the liquids (one or both) are relatively conductive. Electrical conductivity of pure water is substantially nil. However, typically the water has various inorganic materials dissolved in it and is therefore made much more conductive by the presence of such inorganic materials. Many salts in solution will render the solution substantially conductive. Thus, as it becomes more conductive, this imposes limitations on the electrostatic charge which can be used to coalesce the two liquids.

The present apparatus and the related method enable separation of liquids having very close densities. For instance, it is able to separate liquids having a density difference of only about 0.01 in specific gravity The liquids are coalesced and thereby separated. The coalesced aqueous liquid is pulled from the mixture and hence reduces the conductivity of the remaining solution, especially where the aqueous solution has an inorganic salt which markedly increases the conductivity. In other words, the separation changes the electrical conductivity of the mixture and enables recovery of substantially pure organic solvent. The present apparatus can be used in two or three serially arranged stages to thereby obtain very significant purification of an organic solvent. The organic solvent can then be recycled once a desired purity has been achieved. That is, it can be used again in the same process.

The present apparatus is thus a directional flow device utilizing several plastic conical partitions around a central electrode within an upstanding cylindrical housing. Alternate cones are connected to the central electrode. The remaining cones are spaced very close to the electrode to define a narrow gap. So to speak, the electrodes are interleaved so that a tortuous flow path is defined. The flow path periodically carries the mixture adjacent to the electrode to enhance coalescence progressively as the mixture of liquids is separated. The aqueous component is separated stage by stage through the apparatus and is removed to the side for flow through a separate aqueous conduit. This conduit or tube has several entrances for aqueous collection. This defines a separate flow column for the aqueous fluid. It is heavier and therefore tends to flow downwardly by gravity action to accumulate separated aqueous liquid in the bottom of the container. While recovered aqueous fluid is flowing downwardly, the newly introduced organic solvent (with aqueous impurity therein) flows upwardly becoming more pure as it travels. When the separation in the apparatus is accomplished, there is a discharge pipe out of the top of the apparatus which delivers substantially pure organic fluid. By contrast, the aqueous fluid collected in the bottom of the apparatus is removed through an aqueous fluid outlet conduit. Progressively, the aqueous fluid is coalesced and carried away from the interleaved conical members whithin the cylindrical housing. Consequently, the aqueous fluid and organic solvent separation is accomplished notwithstanding very low density differentials.

The flow rate through the device is relatively slow. This enables removal of extremely close density aqueous fluid from the organic solvent. As one example, an organic solvent polyol which is sold under the trademark VORANOL (a trademark of the Dow Chemical Company) is used in chemical processing plants which recover a high concentration of KOH in water solution. The density difference between the two liquids may be only 0.01. This process is distinctly better than the process of recovering aqueous solution of inorganics from polyols as taught in U.S. Pat. No. 3,582,491 which relies on solvent addition to change the density differential.

While the foregoing speaks generally of the background of the present apparatus and method, and provides some description thereof, the preferred embodiment is set forth below in conjunction with the drawings:

DESCRIPTION OF THE DRAWINGS

FIG. 1 is a sectional view of a liquid coalescer in accordance with the teaching of the present disclosure for separating an organic solvent from aqueous solution;

FIG. 2 is an enlarged detailed view showing the interleaved cones and setting forth a typical flow path;

FIG. 3 is a sectional view along the line 3—3 showing details of construction of the aqueous collection tube at a side of the apparatus; and FIG. 4 is a sectional view along the line 4—4, FIG. 1 showing the side location of the aqueous collection tube.

DETAILED DESCRIPTION OF THE PREFERRED EMBODIMENT

Attention is first directed to FIG. 1 of the drawings where the numeral 10 identifies an upstanding cylindrical housing made of a nonconductive material typically being a plastic which is impervious to the organic solvent to be separated. The housing 10 is cylindrical and substantially tall. There is a central electrode 12 which is positioned along the axis of the cylindrical housing 10. It is a small diameter rod which extends perhaps two-thirds of the length of the housing. It is not necessary to extend the full length of the housing. The electrode 12 can be made of composite material as for instance, it can have a plastic rod-shaped body and further include a conductive metal surface thereon. It is an electrode which is connected in a circuit to be described.

The numeral 14 identifies a first cone which is interleaved with a second cone 16. The cones 14 and 16 are alternated along the length of the housing. They are alternated to provide an interleaved construction as will be set forth. Thus, all the cones 14 are identical while the cones 16 are identical. The number of cones can be varied but an adequate number is perhaps 10 or more cones. Since they are alternated, it will be understood that the cones 14 are interleaved with the cones 16, the number of alternate cones 16 being either N, N+1, or N−1 while there are N cones 14. It is not particularly important whether there are more of the cones 14 or the cones 16; what is important is that they are arranged in alternating fashion and are spaced uniformly from one another, and the spacing between adjacent cones is such as to prevent arcing between cones and provide a tortuous flow path as will be described. The numeral 20 identifies an aqueous collection tube. The tube 20 is at one side. It, as needed, can be duplicated at two or three locations. It is parallel to the electrode 12, and is spaced to the side from it. If more than one vertical tube 20 is installed, they are typically spaced evenly around the periphery of the structure so as to furnish two or three aqueous tubes delivering water to the bottom of the structure.

Additional structural components include a bottom closure plate 22. It is formed with a drilled passage to support an upstanding delivery pipe 24. By means of an external line, the mixture of inorganic solvent and aqueous solution is delivered to this apparatus. It flows upwardly through pipe 24 and out through a number of ports in pipe 24. Conveniently, the pipe 24 extends into the cylindrical housing 10 some short distance. The inflow is delivered beneath a disc 26 which is included to force the upward flow to spread for distributed upward flow. In addition, the bottom plate 22 has an outlet opening 28 which is provided to deliver the separated or coalesced aqueous solution. A suitable conductor is connected to the opening or port 28 to remove the separated aqueous solution.

At the upper end of the appartus, the numeral 30 identifies a closure plate which covers the top end of the hollow cylindrical structure. A fitting 32 supports the electrode 12. It provides mechanical or structural support for the electrode 12. The numeral 34 identifies a tapped opening enabling the organic solvent to be removed through the opening. A suitable conduit is connected to that opening, and the outflow is removed.

The apparatus of this disclosure utilizes a voltage source 38. It has been represented as a DC source in FIG. 1. It has one lead 40 which is connected to the electrode 12. The electrode 12 is provided with a suitable potential difference determined by the voltage source 38. The ground side is connected by a conductor 42 to the shell or housing of the cylindrical structure. The shell is preferably made of a suitable plastic impervious to the solvents placed in it. It is preferably made of a material which is sufficiently conductive to serve as a ground. Thus, there is a current flow path from the electrode 12 to the surrounding shell. In a typical installation, the structure may stand perhaps 10 feet tall, in the range of 10 to 30 inches in diameter, and yet will draw only a few milliamperes of current. Typical current levels range up to about 60 ma. If desired, a high voltage DC source can be used capable of providing a selected voltage up to several thousand volts. Alternatively, an AC source can also be used. For convenience, line frequency can be used although other frequencies are acceptable. Depending on the nature of the two liquids being separated and scale factors, the voltage, current and frequency can be varied over a substantial range. In one example, the following values were selected. For a flow of about sixty quarts per minute at about 100° C. of a mixutre of polyol (about 84%) and about 16% water dissolving 0.3% KOH, a treated mixture having about 131 ppm KOH, where about 95% of the KOH, was removed. The voltage system was operated at about 2200 volts with a current flow of about 14 ma.

Attention is next directed to FIG. 2 of the drawings which shows enlarged details of the structure. Here, the interleaved conical member 14 is shown supported by the electrode 12. The electrode 12 is a central support for the conical member. The conical member 14 is made of a nonconductive material, typically a plastic to be impervious to the liquids flowing through the apparatus. It is solid around the conic surface except at a drilled hole 48. Around the full circle of the conic member, the hole 48 is duplicated at several elevations. When installed, the conic member 14 thus positions several holes at an elevation approximately consistent across the illustrated holes of this disclosure. The hole 48 should be spaced away from the electrode 12. However, it need not be close to the cylindrical shell 10. It is placed approximately two-thirds or three-fourths of the distance from the electrode 12 to the housing. The conical member 14 is installed parallel to and spaced from the similar conical member 16. The two are fabricated of identical stock in ordinary circumstances. Before installation, the hole formed at the center of the conical member 14 is made snug around the electrode 12 and indeed, a suitable adhesive or other fastening means is used to attach the two. By contrast, the conical member 16 is spaced from the central electrode 12. There is a flow gap 50 between the two. This gap 50 is formed by cutting a slightly larger central hole in the conical member 16. Moreover, the hole 48 in the conical member 14 is not duplicated.

The numeral 52 identifies the tortuous flow path for the liquid. Recall that liquid is introduced at the bottom and is removed (in part) from the top of the apparatus. The flow path is thus generally upwardly through the apparatus. The flow path directs the mixture of aqueous and organic solvent through the hole 48 and then towards the gap 50. This tortuous flow path is repeated N times dependent upon the number of interleaved concial members 14 and 16.

The conical member 16 is thus supported by the cylindical outer shell 10. It is spaced from the electrode and does not otherwise touch it. The gap 50 provides a flow path which is of sufficient cross sectional area to deliver the flow from inlet to outlet. However, it is made sufficiently narrow that coalescence occurs as the commingled liquids are introduced into the gap 50.

The numeral 52 identifies a liquid-liquid interface. Its height has been exaggerated for explanatory purposes. The liquid level 52 represents the collection of the heavier of the two liquids. Recall that the conic member 16 is a full 360° around the interior of the cylindrical housing 10. This enables the liquid which is heavier to collect in this low area. The thoroughly mixed liquids flow through the gap 50. There is a tendency for the heavier aqueous solution to coalesce into larger and hence heavier droplets in the organic liquid. By gravity, heavier drops must flow downwardly along the conical member 16. Recall that the tortuous flow path carries such heavier droplets downwardly. The heavier droplets continue to flow downwardly by gravity and collect to form the heavier liquid accumulation at the low area. This low area fully encircles the conical disc 16. So to speak, it is defined as a V-shaped trough on the interior of the equipment.

The heavier liquid at the interface 52 would ordinarily collect and accumulate and the level would rise indefinitely. It is collected in this area but it is removed during operation of the device. Recall that the upstanding aqueous collection pipe 20 is very close to the edge of the conical member 16. The member 20 is a hollow upstanding pipe. It passes through a suitable drilled hole formed in the concial member 16. The conical member 16 is one side of the collection trough. This collection area or trough is thus drained through a hole or slot 54 formed in the collection tube 20. The collection tube 20 has an entrance hole 54 in the preferred form of a slot just above the conical member 16 to thereby remove the heavier liquid. The heavier liqluid flows into the slot 54 and fills the tube 20. By gravity due to the difference in density, the heavier liquid flow downwardly in the conduit 20. There is no mechanical pump to cause the downward flow; the downward flow is the result of density differential, thereby causing lighter liquids to rise in the housing 10 and heavier liquids to settle to the bottom. The tubing 20 thus receives an inflow of heavier aqueous solution at n openings 54, there being preferably an opening at each of the conic members 16. This prevents the accumulation of heavier liquid in the various V-shaped troughs at each of the conical members 16. Referring back to FIG. 2, this lowers the interface 52 to the level defined by the opening 54. The opening 54 is duplicated at several locations, preferably at each of the conic members.

The collection tube 20 extends into the bottom of the cylindrical housing 10 and has a discharge port 56. The heavier liquid is delivered and collected by gravity in the bottom of the housing 10. It rises to define a liquid-liquid interfce 58. This interface is maintained below the level at which a newly added liquid is introduced into the cylindrical housing 10. Liquid accumulates in this area, and the opening 28 is used to remove the accumulated heavy liquid. The rate of flow out of the housing 10 is adjusted to be sure that the heavier liquid at interface 58 is not removed. That is, the rate of discharge of the heavier liquid is limited so that there is always an accumulation in the bottom part of the housing. This assures that the lighter organic solvent is not retrieved through the aqueous outlet line connected at 28.

An inverted V-shaped trough is defined by the conical member 14 adjacent to the electrode 12. A liquid-liquid interface 60 is thus illustrated in FIG. 2. The liquid-liquid interface 60 indicates a region of substantially clean or dewatered organic solvent. It is trapped in this region. It may remain trapped for a long period of time. It is a collection of substantially pure organic solvent. Since it is free of water and any inorganic salt carried in the water, it is able to collect in this area and will stay indefinitely. This is desirable because it positions the organic solvent close to the electode. This reduces the average conductivity of the liquid around the electrode 10. That is, this collection serves to bias the conductivity. This bias reduces current flow because it reduces the aggregate or average conductivity in the system.

In operation, a flow of organic solvent with an aqueous solution (carrying some measure of dissolved inorganic material in the aqueous solution) is introduced through the mixture delviery line shown in FIG. 1. The mixture flows upwardly through the housing 10. A suitable voltage is selected for operation of the equipment. As it flows, assume that the aqueous solution has the form of extremely small droplets dispersed in the organic solvent. As the liquid passes near the electrode 12, small droplets are forced together. When the droplets are small, surface tension holds them in suspension. When the droplets become larger, the buoyancy provided by surface tension is overcome by the downward pull of gravity, i.e., the heavier droplets tend to settle towards the bottom. This coalescing action occurs when the mixture flows through the gap 50. As it is forced to flow along the tortuous path downwardly to come to the next opening 48, the heavier coalesced droplets will flow downwardly into the V-shaped trough to collect, defining the liquid-liquid interface 52. While some of the droplets will drop out at each of the conical members, after the mixture has flowed through the entire structure, a very significant portion of the aqeuous solution is removed. Lower recovery rates can be obtained by reducing the number of conical members. The dwell time of the liquid in the housing is also a significant factor. in other words, reducing the flow rate increases the dwell time and thereby increases the exposure interval of each droplet to the electrical coalescing field. Because the droplets are buoyant in the organic solvent, they are easily forced to move by the applied electric field from the electrode. That is, the individual droplets are manipulated by electrical interaction. They are drawn together and tend to coalesce into larger droplets. They are drawn together and distorted from the classic spherical shape of the droplets. This shape is distorted, and the coalescing action in enhanced. The precise mechanism by which coalescing droplets are formed may involve several factors but it is sufficient to note that large droplets are formed from small droplets, and they then move by gravity into the V-shaped trough for collection. The collected heavier aqueous solution flows into the tube 20.

If any organic solvent enters the tube 20, it will flow upwardly. When the device is first used without aqueous fluid solution in the tube 20, the mixture will separate aqueous flowing downwardly while the organic solvent will flow upwardly to the top end of the tube 20. For this reason, the tube 20 is open at the top end. At some level, this will define a liquid-liquid interface in the tube 20 near the top end. Because the heavier aqueous solution flows downwardly, the top end of the housing 10 is substantially pure organic solvent. That is, the region near the upper end of the housing 10 is filled with substantially pure organic solvent.

The present apparatus accomplishes substantial removal of water-borne inorganic salts from an organic solvent. If extreme purity is desired, two or three units of this equipment can be cascaded. Various scale factors can be changed to also alter the action. The flow rate through the equipment is one of the factors. If the flow rate is rapid, the coalesced droplets do not have time to settle out by gravity towards the V-shaped collection trough above the conical member 16. The flow rate is therefore maintained relatively slow to assure greater exposure to the field in the gap 50 and to also provide a greater time interval for gravity collection of the larger droplets as they fall out of the tortuous flow path into the V-shaped trough.

This is particularly true in separating KOH in water solution from polyols used in various manufacturing processes. Both the description of the apparatus and the drawings presume that the organic solvent is lighter than the aqueous solution which causes the organic to rise and the aqueous solution to settle.

While the foregoing is directed to the preferred embodiment, scope is determined by the claims which follow.

We claim:

1. In an upright aqueous and organic liquid phase coalescer, an apparatus comprising:
   (a) upstanding chamber means having a centrally located electrode therein for initiating electrostatic coalescing of dispersed aqueous and organic liquids mixed together;
   (b) means for introducing dispersed aqueous and organic liquids into said chamber means;
   (c) interleaved partition means in said chamber means for directing liquid flow moving along said chamber means along a tortuous path toward and away from said electrode, said partition means forming settlement trap means in said chamber means for collecting liquid stratifying in separated coalesced phases; and
   (d) flow means connected to said trap means in said chamber means for removing stratified liquid therefrom.

2. The apparatus of claim 1 wherein said setlement means comprises a valley defined between an upstanding wall comprising said chamber means connected with a tapered conic member comprising said interleaved partition means, and an opening therein communicating with a tube comprising said flow means.

3. The apparatus of claim 1 wherein said interleaved partition means includes first partitions in said chamber means interleaved with second partitions, the first partitions supported around the outer perimeter thereof at the wall defining said chamber means, and the second partitions comprising interleaved partitions, the two sets defining a tortuous flow path therethrough.

4. The apparatus of claim 1 wherein said flow means comprises an upstanding flow conduit for collecting the heavier of the liquids in said chamber means, and having an opening for accumulating the heavier of said liquids in the bottom of said chamber means, an outlet means at the top end of said chamber means for removing the lighter of said liquids after stratifying at said settlement means the lighter liquid flowing through said flow means.

5. The apparatus of claim 1 wherein an entrained flow of aqueous and organic liquid is introduced into said chamber means through an inlet means opening into the bottom of said chamber means, and said chamber means comprises an upstanding cylindrical housing supporting a centrally located electrode therein.

6. The apparatus of claim 5 including a voltage source connected to said electrode to create an electrostatic attraction acting on the liquids in said chamber means, and wherein said interleaved partition means directs flow adjacent to said electrode for exposure to electrostatic attraction causing dispersed droplets to coalesce and thereby form larger droplets; and wherein the larger droplets collect at said settlement trap means.

7. The apparatus of claim 6 wherein said flow means includes:
   (a) an upstanding vertical tube;
   (b) opening means into said tube from said settlement trap means for delivery of separated coalesced liquid, said opening means receiving such liquid by gravity flow into said tube; and
   (c) a bottom outlet on said tube delivering liquid by gravity flow into collection chamber means.

8. The apparatus of claim 7 wherein said collection chamber means is a lower portion of said upstanding chamber means.

9. The apparatus of claim 8 wherein said tube removes coalesced heavier liquid by gravity flow into said collection chamber means and further including a lighter liquid collection chamber means in the upper portion of said chamber means and wherein said interleaved partition means in said chamber means directs flowing liquid to said lighter liquid collection chamber means.

10. A method of separating dispersed aqueous and organic liquids having a density difference as small as 0.01 comprising the steps of:
    (a) directing the flow of mixed liquids along a tortuous path past an electrostatic field to coalesce;
    (b) collecting by gravity settlement coalesced droplets of the heavier liquid after flowing past the electrostatic field;
    (c) wherein the collecting step is aided by directing the flow through a turn along the flow path;
    (d) directing the collected coalesced droplets into an opening of a collection tube for gravity flow in the tube into a collection chamber means to accumulate heavier liquid;
    (e) while collecting the heavier liquid, directing the flow of mixed liquid along the tortuous flow path to ultimately accumulate the flow at an elevated location after removal of the heavier coalesced droplets; and
    (f) wherein the tortuous flow path passes an electrostatic field a selected number of times and exposure to the electrostatic field is followed by a collecting step wherein collected coalesced droplets are directed by a collection tube into the collection chamber means.

11. The method of claim 10 wherein said flow path is folded to pass an electrostatically charged electrode means to enable the flowing liquid to be coalesced to remove droplets dispersed in the liquid.

12. The method of claim 11 including the step of folding the flow path by placing spaced flow directors to define a serpentine path having multiple bights adjacent to said electrode means.

13. The method of claim 12 including the step of directing flow downwardly, then turning the flow upwardly, wherein the change of direction aids gravity to remove heavier droplets from the flow and thereby collect heavier droplets.

14. The method of claim 13 further including the step of directing the gravity pull and change of direction to jointly remove droplets having a density of about 0.01 greater than the liquid in the flow.

15. The method of claim 14 wherein the collecting step is repeated N times where N is an integer.

16. The method of claim 10, wherein said heavier droplets are aqeuous solutions.

17. The method of claim 10, wherein said heavier droplets are organic solvent.

* * * * *